Dec. 17, 1946.   J. R. SMITH   2,412,757
TOOL HOLDING MEANS FOR AUTOMATIC SCREW MACHINES
Filed Dec. 11, 1944   2 Sheets-Sheet 1
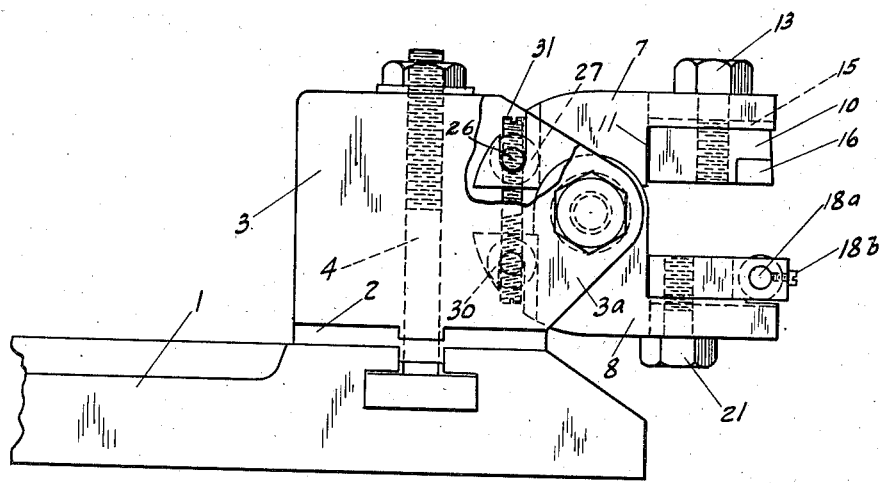
Fig_1_
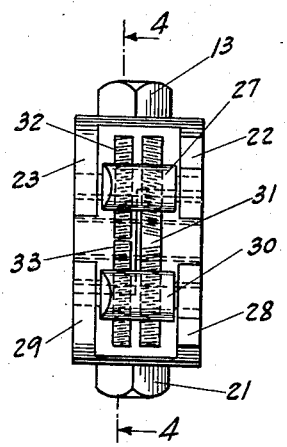
Fig_3_
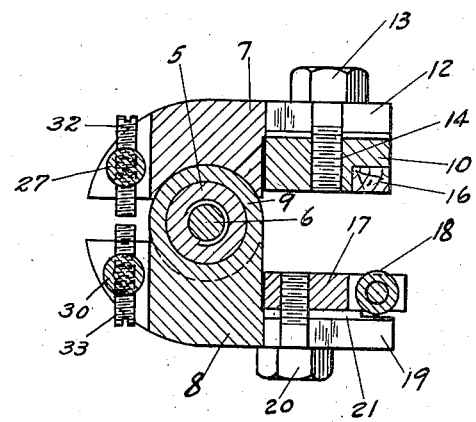
Fig_4_
INVENTOR.
John R. Smith
BY Robb & Robb
Attys.

Dec. 17, 1946.  J. R. SMITH  2,412,757
TOOL HOLDING MEANS FOR AUTOMATIC SCREW MACHINES
Filed Dec. 11, 1944  2 Sheets-Sheet 2

INVENTOR.
John R. Smith
BY Robert Robb,
Attys.

Patented Dec. 17, 1946

2,412,757

UNITED STATES PATENT OFFICE 2,412,757

TOOL HOLDING MEANS FOR AUTOMATIC SCREW MACHINES

John R. Smith, Cleveland, Ohio

Application December 11, 1944, Serial No. 567,714

2 Claims. (Cl. 82—35)

My present invention pertains to the art of automatic screw machines and embodies particularly certain novel tool holding means for such machines.

My present improvements are especially adapted for use in conjunction with Brown & Sharpe automatic screw machines, though they may be well adapted to other automatic screw machines of the same general class.

A special object of my invention has been to provide an improved tool holder involving the use of complemental tool supporting or carrying members adapted to support tool or work holding blocks, and a special objective achieved by my improvement lies in provisions for the quick adjustment or removal of the said blocks permitting of quick adjustment and interchanging of tool members as may be required for different kinds of operations of the automatic screw machines. With the use of the improvement of my invention, the work entailed in adjusting and removing tool blocks or members is greatly reduced by reason of the provision for the quick adjustment and removal or interchanging of the tool parts obtained by the employment of my invention under practical conditions of service.

A further object of my invention has been to provide tool holding means which may be employed on either the front or back slide of a screw machine, and wherein a tool may be passed over or under the spindle which may run either forwardly or backwardly.

Still another feature of my invention lies in the specific adjusting provisions utilized for the adjustment of the tool or work supporting block of the tool carrying members and the additional provisions for the quick setting or locking of these members at the desired adjustment once obtained.

While my invention in its preferred embodiment illustrated herein discloses a shaving tool unit, it is to be understood that other types of tools may be employed as a part of the tool holder, largely dependent upon the nature of the work to be performed by the screw machine.

In the accompanying drawings:

Figure 1 is a side view showing a conventional type of front cross slide having a conventional tool post mounted thereon, the latter carrying the improved tool holding unit of my invention.

Figure 3 is a rear view of the tool holder alone and bringing out more clearly the arrangement and mounting of the adjusting screw and the setting or locking screw.

Figure 4 is a vertical sectional view of the tool holder taken about on the line 4—4 of Figure 3.

Figure 2:
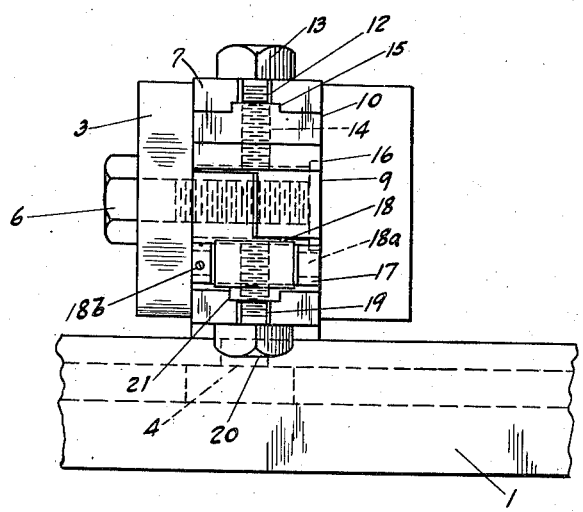
Figure 2 is a view in elevation looking toward the end of the tool holding unit.

Describing my invention in detail in particular relation to the improvements thereof, I refer first to Figure 1 of the drawings in which are shown the front cross slides as conventionally used in a Brown & Sharpe automatic screw machine, the same being designated at 1. This cross slide 1 carries the rising block 2 upon which is mounted the tool post 3 held in place by the clamping bolt 4, these several parts being conventional in the art. The tool post 3 is provided with the extension 3a upon which is mounted the tool holder of my invention, the latter unit being supported by means of an internally threaded sleeve 5 and screw bolt 6 which pass through the portion 3a of the tool post 3.

Figure 6:
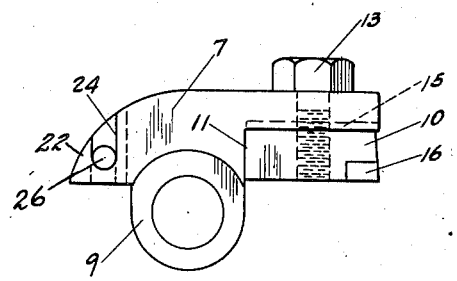
Figure 6 is a side view of one of the tool carrying members showing the tool block thereof in position, the latter being interchangeable with a work supporting block and dependent upon the particular type of operation that is to be performed by the use of the invention.
Figure 7:
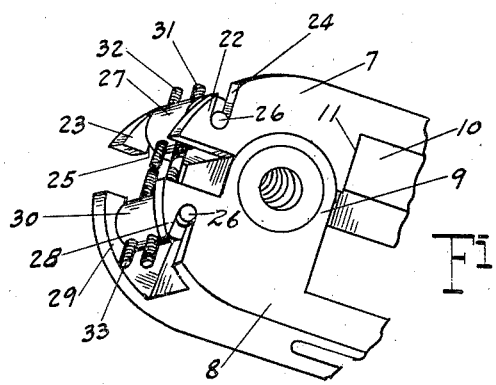
Figure 7 is a fragmentary perspective view of the rear portion of the tool holding unit.

The tool holding unit of my invention is composed of two complemental members, the upper member 7 and the lower member 8. These two members are in the form, generally speaking, of upper and lower jaws, respectively. The members 7 and 8 are supported in a pivotal manner upon the portion 3a of the tool post 3, said members 7 and 8 each being formed with a pivoting bearing sleeve portion 9 as seen in Figure 6 in respect to the upper member 7 and said bearing sleeve portions 9 being disposed side by side when the parts 7 and 8 are assembled in superposed relation to each other upon the tool post 3. The sleeve 5 passes through the bearing member 9 of the parts 7 and 8 as well as through the horizontal openings in the portion 3a of the tool post, and the members 9 so connect the tool holding members 7 and 8 as to permit of pivotal movement of the latter relatively to their axis upon the post 3. The members 7 and 8 are of like construction and are interchangeable, so that they may be reversed in reference to their positions as illustrated in Figure 1 if the nature of the work so requires.

It will be seen that the tool holding member 7 is equipped with the adjustable and removable tool block 10 which is disposed in a seat 11 cut out from the structure of the member 7 at its outer free end portion. For attaching the tool block 10 in position upon the member 7, I form the outer end of said member 7 with a longitudinal central slot 12 through which the headed screw 13 passes, the said screw being screwed into a suitable threaded opening 14 in the block 10. To accurately support the tool block 10 in position beneath the outer end portion of the member 7, I provide at the upper surface of the block a longitudinal rib 15 adapted to be received in a longitudinal kerf or groove formed in the underside of the slotted outer end portion of the member 7. The foregoing provides an interlocking slidable connection between the members 10 and 7, ensuring accurate emplacement of the member 10 in its relation to the member 7. The member 10 may be made of solid high speed steel formed with the cutting tool or shaving tool to be used, or as seen in the drawings, the cutting or shaving member or tool may be a carbide insert such as designated at 16.

The tool holding member 8 is of substantially identical construction with the member 7 except that, as shown in the drawings, the member 8 is illustrated as carrying the roll supporting block 17, the roller 18 of which is mounted rotatably in the block in the manner shown in Figure 4 and Figure 2. The block 17 is held in place by means similar to the means used for connecting the block 10 with the upper tool carrying member 7. In other words, the lower member 8 is slotted at 19 similarly to the upper member 7 and a screw bolt 20 is employed to attach the block 17 to the member 8 in a position somewhat reverse to the disposition of the tool block 10 as illustrated in Figure 4. It is contemplated that the block 17 shall be provided on its underside with a rib 21 to enter a kerf or groove at the upper side of the supporting portion of the tool holding member 8.

Since the parts 17 and 10 are interchangeable, it will be understood that the shaving tool 16 may pass beneath or over the work with spindle running backwardly or forwardly by properly emplacing the tool block 10 either upon the member 7 or upon the member 8, as may be desired. In other words, the parts 10 and 17 may be reversed in performing shaving operations.

It will be apparent that in order to adjust the members 10 and 7, or remove and replace them, only involves the operation of a slight turn of unscrewing movement to the screws 13 and 20 and either member 10 or 17 may thus be quickly detached from its supporting part 7 or 8, as the case may be, and just as quickly replaced and firmly adjusted in position. This is an advantage derived from my invention that I do not believe is obtained in the use of any tools for the same purpose as my invention, as heretofore known in the art.

Figure 5:
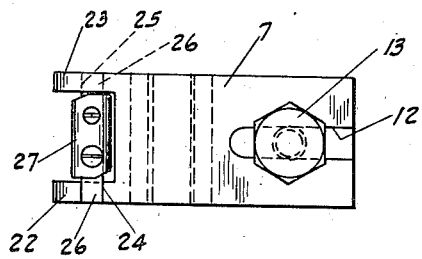
Figure 5 is a top plan view of the tool holder alone.

For relative adjustment of the members 7 and 8 for correspondingly adjusting the parts 10 and 17, and 18, relatively to each other, I provide a special screw adjusting device working in conjunction with locking or set screws associated therewith. This feature of my invention is shown most clearly in Figures 3, 4, 5, and 6 of my drawings, and referring particularly to Figures 4 and 5, it will be seen from Figure 5 that the upper member 7 is illustrated as being formed at its rear or inner end with two bearing lugs 22 and 23. The bearing lug 22 has an upwardly extending bearing slot 24 therein and the bearing lug 23 has a downwardly opening bearing slot 25 therein. These bearing slots 24 and 25 receive the trunnion members 26 at the end of a bearing block 27, one of which is provided for each of the members 7 and 8. The bearing block 27 may rotate on its trunnions 26 within the slots 24 and 25.

When the two members 7 and 8 are assembled, and looking at them from their rear ends, the downwardly opening slot 25 of the bearing member 23 opens toward the open end portion of a similar slot in the lower member 8, whereas the upwardly opening slot 24 of the member 22 opens upwardly and is opposite a similar slot in the lower member 8 which opens downwardly. Figure 3 illustrates the above feature more clearly than the other views of the drawings, and the right bearing member for the tool holding member 8 is designated 28 and the left one 29. In this figure it wil be seen that the bearing slots of the members 22 and 28 are open in opposite directions whilst the slots of the members 23 and 29 are open toward each other. A bearing block 30 similar to the bearing block 27 has trunnions 26 similar to those previously described, the same being in the slots of the parts 28 and 29.

Connecting the bearing blocks 27 and 30, as seen in Figure 3, is the adjusting screw 31, the same formed with right and left hand threads at the opposite ends thereof. The threads of one direction pass through the block 27 and the threads of the other direction pass through the block 30. By turning the screw 31 by application of a screw driver to its upper end where a suitable kerf is provided, the tool holding members 7 and 8 may be given pivotal movement for adjusting them to their proper accurate position. After the adjustment is obtained, the members 7 and 8 may be locked in such adjustment by the provision of the locking or setting screws designated 32 and 33, the screw 32 being carried in the block 27 and the screw 33 carried in the block 30, the adjacent ends of these screws being adapted to abut with one another for locking impingement or setting action. Screw driver application kerfs are provided in opposite ends of the screw 31 and in the upper end of the screw 32 and lower end of the screw 33.

By means of the adjusting and setting devices just described it will be apparent that the block carrying outer ends of the members 7 and 8 may be very quickly adjusted and locked in their proper relative position for use on the screw machine in the actual work to be performed by the shaving block or tool 10 and the supporting block 17.

Effectively speaking, the reason for the peculiar arrangement of the slots in the bearing members 22, 25, 29, and 28 is to enable the bearing blocks 27 and 30 to exert pressure on the inner ends of the oppositely extending slots of the members 22 and 28 for pulling on the members 22 and 28 to separate the outer end of the tool carrying members 7 and 8. On the other hand, the bearing blocks 27 and 30, through the left hand trunnion seen in Figure 3, when separated by means of the adjusting screw 31, will exert a pushing effect on the ends of the slots which open toward each other, thereby to cause the outer ends of the tool carrying members 7 and 8 to move toward each other.

Once the desired adjustment of the parts 10 and 17, relatively to each other, has been obtained by means of the movement of the tool carrying members 7 and 8, the setting or locking screws 32 and 33 are adjusted so as to impinge each other and thereby lock the parts 7 and 8 in their fixed adjusted position.

From the foregoing it will be apparent that I have povided a simple and novel construction of tool holder adapted for the purposes stated, wherein, by the simple partial turning of the screw bolts 13 and 20, the tool blocks or roll or work supporting blocks that may be carried by the members 7 and 8 may be quickly removed and replaced, utilizing a minimum amount of time of the expert workman handling the machine.

Also, in order to adjust the tool 10, or any equivalent tool or tools that may be carried by the members 7 and 8, as well as a work holding member or supporting member that may be carried by one of the members 7 and 8, the tool and/or work supporting means may be quickly brought into its proper position for operating upon the work or supporting the work, as the case may be, and after being so adjusted, the parts 7 and 8 with the corresponding part 10 and/or 17 may be locked in their adjusted positions in the manner previously described in connection with the action of the parts 32 and 33.

The adjusting screw holds the bearing blocks 27 rigid in parallel relation with their trunnions properly seated at the inner ends of the slots of the bearing members of the parts 7 and 8.

As seen in Figures 1, 4, and 2, most clearly, the work supporting roller 18 is carried by a shaft 18a which is fixed from displacement in bearings in the opposite sides of the block 17 by means of a set screw 18b. This set screw permits of detachment of the shaft 18a and removal and replacement of the roller 18 in a quick manner.

Having thus described my invention, what I claim as new and desire to secure by Letters Patent of the United States, is—

1. In tool holding means for automatic screw machines or the like, a tool holding unit comprising upper and lower complemental tool holding members movably connected together intermediate their ends, corresponding ends of the said members being adapted to receive a tool, and a connecting unit intermediate the opposite ends of said members including oppositely acting screw members for moving the said members toward and from each other, combined with a rotative bearing member on each tool holding member having threaded engagement with each of said screw members.

2. Tool holding means as claimed in claim 1, in which the said screw members are oppositely threaded, each rotative bearing member on each tool holding member having threaded engagement with its associated screw member, one bearing member provided with trunnions for pushing and the other provided with trunnions for pulling engagement with the tool holding members.

JOHN R. SMITH.